(12) United States Patent
Dabell

(10) Patent No.: US 6,621,862 B1
(45) Date of Patent: Sep. 16, 2003

(54) EQUALIZATION FOR MULTICHANNEL RECEIVING NODE

(75) Inventor: Steve Dabell, Spokane, WA (US)

(73) Assignee: Alcatel Internetworking (PE), Inc., Spokane, WA (US)

( * ) Notice: Subject to any disclaimer, the term of this patent is extended or adjusted under 35 U.S.C. 154(b) by 0 days.

(21) Appl. No.: 09/477,509

(22) Filed: Jan. 4, 2000

(51) Int. Cl.[7] .............................. H03H 7/30; H03H 7/40; H03K 5/159
(52) U.S. Cl. ..................... 375/229; 375/232; 375/233
(58) Field of Search .................. 375/229, 232, 375/233, 316

(56) References Cited

U.S. PATENT DOCUMENTS

| | | | | |
|---|---|---|---|---|
| 5,844,951 A | * | 12/1998 | Proakis et al. | 375/233 |
| 5,956,371 A | * | 9/1999 | Yamane | 375/232 |
| 6,178,201 B1 | * | 1/2001 | Hillery | 375/232 |
| 6,421,378 B1 | * | 7/2002 | Fukuoka et al. | 375/229 |
| 6,426,972 B1 | * | 7/2002 | Endres et al. | 375/229 |

OTHER PUBLICATIONS

Adaptive Filter Theory by Simon Haykin, Third Ed., Ch.9, Prentice Hall, 1996.
Adaptive Signal Processing by Bernard Widrow and Samuel Stearns, Ch.6, Prentice Hall, 1995.

* cited by examiner

Primary Examiner—Chi Pham
Assistant Examiner—Demetria Williams
(74) Attorney, Agent, or Firm—Christie, Parker & Hale, LLP

(57) ABSTRACT

An equalization method and apparatus for equalizing a plurality of input signals received on a multichannel link leverages shared equalization resources to generate dedicated tap coefficients for application to the signals and updates the dedicated tap coefficients upon measured degradation in the quality of the signals. The equalization method and apparatus achieves acceptable bit error rates with relatively low overhead.

11 Claims, 6 Drawing Sheets

EQUALIZATION FOR MULTICHANNEL RECEIVING NODE

FIELD OF THE INVENTION

The present invention relates to devices for improving the quality of data signals and, more particularly, to devices for improving the quality of data signals distorted during transmission over a link.

BACKGROUND OF THE INVENTION

In data communication networks, network nodes communicate by transmitting analog signals over links, such as a Category-5 cable. The receiving node is responsible for recovering digital data bits from the analog signal. Because distortion is introduced during transmission over the link, the receiving node must generally improve the quality of the signal prior to attempting data recovery. Signal quality is typically improved through a process known as equalization which, generally speaking, compensates for distortion introduced on a link and reshapes the signal closer to its original waveform. Without adequate equalization, distortion might cause either a total inability to recover the transmitted data, or recovery of data with an unacceptably high incidence of bit errors.

Equalization presents technical challenges because the nature and extent of distortion varies from network-to-network and link-to-link. The nature of distortion may be affected by numerous factors, such as channel length, transmission frequency, impedance mismatch, electromagnetic interference, and, to a generally lesser extent, impediments in connectors and coupling transformers, manufacturing variations and environmental factors such as temperature. Additional complications may arise from the dependence of some distortion-causing variables on others, such as the frequency dependency of signal attenuation for a given channel length.

Due to the often complex mix of factors causing distortion on real-world links, adaptive equalization has generally been favored over static equalization to compensate for such distortion. Static equalization applies a fixed corrective response, or "tap", to a signal. Static equalization is therefore not well suited to compensating for distortion that is unpredictable and time-variant. Conventional adaptive equalization, on the other hand, applies a dynamic corrective response to a signal, which response is updated in real-time based on continuous sampling of the signal, and is therefore better able to compensate for unpredictable and time-dependent distortion. Better signal quality and lower bit error rates result.

However, conventional adaptive equalization is not without its shortcomings. Conventional adaptive equalization has generally required substantial overhead, i.e. large gate count, which has translated into high chip costs. For links where distortion is relatively predictable and varies slowly with time, such adaptive equalization may therefore be "overkill". It has been found, for instance, that distortion introduced on multichannel Gigabit Ethernet links over Category-5 cable is primarily caused by impedance mismatch producing reflections within a channel and crosstalk between the channels, and does not change very rapidly. For such multichannel links, a receiving node implementing a novel equalization that leverages shared equalization resources to improve the quality of multiple signals, and updates the corrective responses applied to such signals only when necessary (i.e. not in real-time), may achieve acceptable bit error rates with far less overhead than would be required by conventional adaptive equalization.

SUMMARY OF THE INVENTION

In a basic feature, the present invention provides a novel equalization apparatus and method therefor for improving the quality of signals received over a multichannel link. The method generates dedicated tap coefficients for a plurality of input signals received over the link including sampling the input signals and applying the samples in a shared tap coefficient algorithm, which tap coefficients are applied to the input signals to which they are dedicated to generate output signals and are updated based upon degradation in the quality of the output signals corresponding to the input signals to which the tap coefficients are applied. Degradation in the quality of output signals is measured by comparing the bit error rate of the output signals with a predetermined threshold.

The apparatus includes an equalization controller shared among a plurality of input signals and arranged to generate a dedicated tap coefficient for each input signal including sampling the input signal in a first instance and applying the first sample as an input to a tap coefficient algorithm, and arranged to update the dedicated tap coefficient for the input signal including sampling the input signal in a second instance in accordance with feedback received by a performance monitor and applying the second sample as an input to the tap coefficient algorithm.

The apparatus further includes a signal filter dedicated to each input signal and arranged to generate an output signal including receiving the input signal and applying the input signal as a first input to a plurality of multiply functions, each multiply function having as a second input a different coefficient within a dedicated coefficient set received from the equalization controller to generate a plurality of products, and applying the plurality of products to an accumulate function.

The apparatus further includes a performance monitor dedicated to each output signal and arranged to apply feedback to an equalization controller including comparing the bit error rate of the output signal with a predetermined threshold and generating a feedback signal upon the output signal exceeding a predetermined threshold.

These and other aspects of the invention can be understood by reference to the following detailed description, taken in conjunction with the accompanying drawings, which are briefly described below.

DETAILED DESCRIPTION OF THE PREFERRED EMBODIMENT

Figure 1:
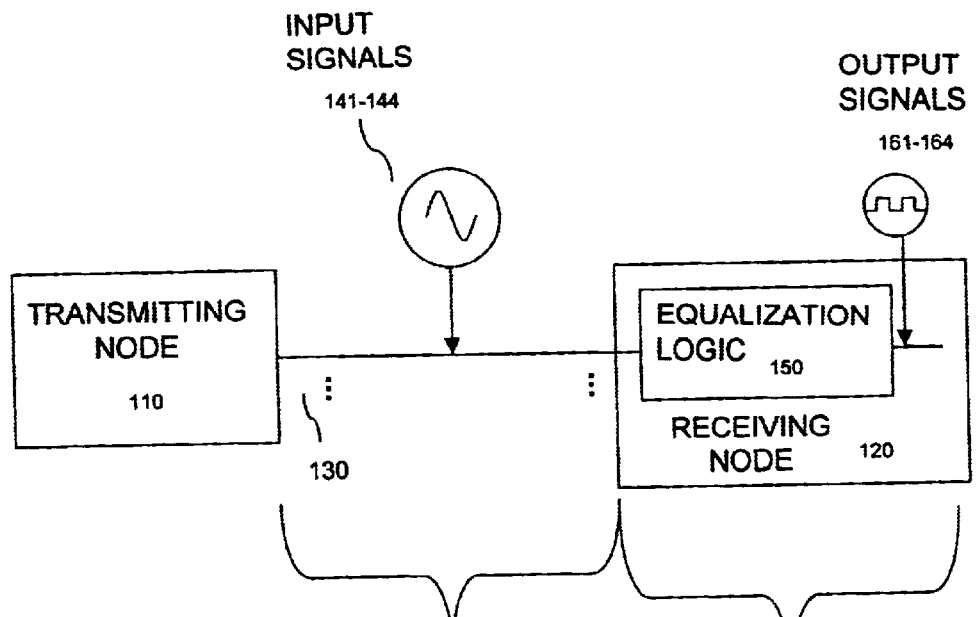
FIG. 1 is a generalized block diagram illustrating a transmitting node transmitting a data signal to a receiving node over a link.

Turning now to the drawings, and first to FIG. 1, transmitting node 110 and receiving node 120 in a data communication network are interconnected by a link 130, such as a Category-5 cable. Transmitting node 110 communicates with receiving node 120 by transmitting channelized data signals over link 130 in a data communication protocol, such as Gigabit Ethernet. Nodes 110, 120 are data communication networking elements, such as switches, bridges, hubs, repeaters, servers, workstations or personal computers, or a combination thereof. Receiving node 120 receives input signals 141–144, equalizes input signals 141–144 at equalization logic 150 and transmits output signals 161–164. It will be appreciated that transmitting node 110 may include receiving node capabilities, and receiving node 120 may include transmitting node capabilities, such that nodes 110, 120 may engage in bidirectional communication.

Figure 2:
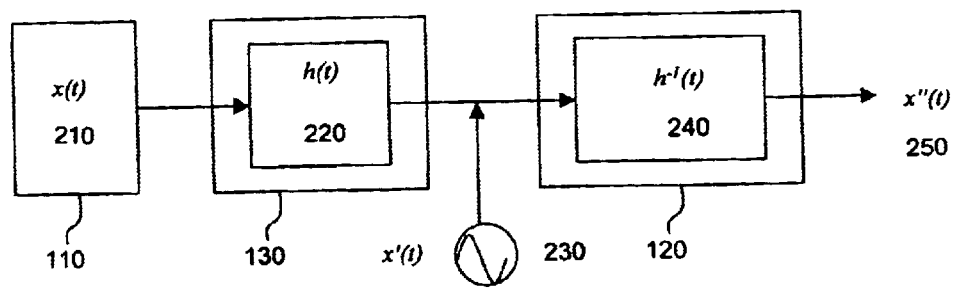
FIG. 2 is a generalized block diagram representing equalization of a signal transmitted according to FIG. 1.

The present invention is directed primarily to a novel equalization capability at receiving node 120, and more particularly at equalization logic 150, for improving the quality of input signals 141–144. Referring to FIG. 2, a highly generalized mathematical representation of equalization is shown by reference to a signal x(t) 210. Signal x(t) 210 at transmitting node 110 is transmitted on link 130 where signal x(t) 210 is subjected to a channel impulse response h(t) 220 resulting in distorted signal x'(t) 230. Distorted signal x'(t) 230 is received at receiving node 120 where signal x'(t) 230 is subjected to a corrective impulse response approximating $h^{-1}(t)$ 240 resulting in equalized signal x"(t) 250 which approximates signal x(t) 210.

Figure 3:
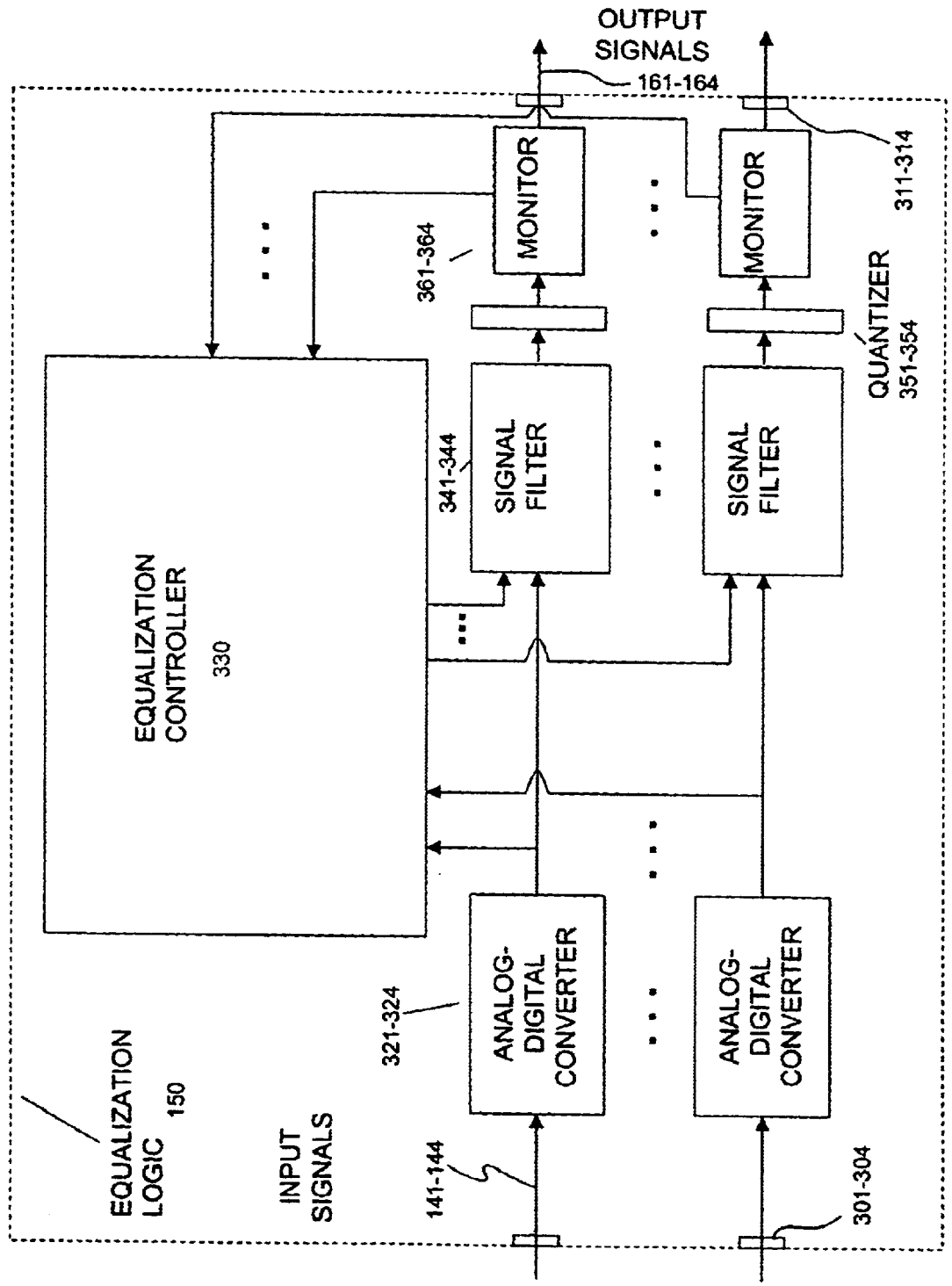
FIG. 3 is a more detailed block diagram of equalization logic illustrated in FIG. 1.

Referring now to FIG. 3, equalization logic 150 is shown in a preferred embodiment. Logic 150 receives input signals 141–144 at inputs 301–304 and transmits output signals 161–164 at outputs 311–314. Logic 150 includes analog-digital converters 321–324. Converters 321–324 are simple, fixed elements for converting input signals 141–144 from analog into digital format. There are four converters 321–324 shown, for converting four input signals 141–144 comprising a Gigabit Ethernet signal, each input signal transmitting data over link 130 at a bit rate of two hundred fifty megabits per second (Mbps), although the number of input signals and converters will vary with network requirements. Input signals 141–144 are transmitted to equalization controller 330 and signal filters 341–344. Signal filters 341–344 modify input signals 141–144 and, in conjunction with coefficients supplied by equalization controller 330, generate output signals 161–164. Output signals 161–164 are applied to quantizers 351–354, which "force" output signals 161–164 to binary representations of data bits, e.g., ones and zeroes, and transmit output signals 161–164 to performance monitors 361–364 prior to transmission from logic 150 via outputs 311–314.

Figure 4:
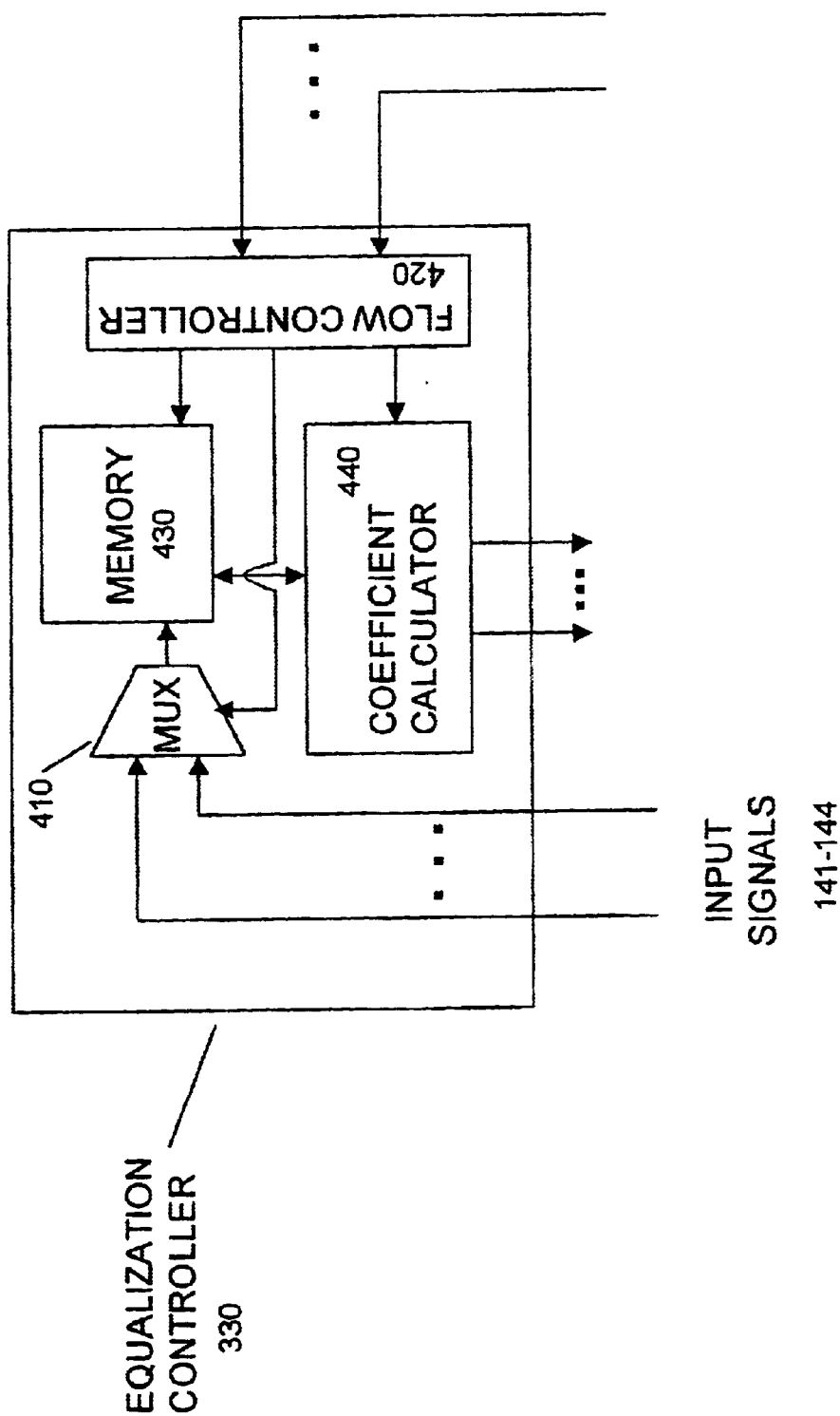
FIG. 4 is a more detailed block diagram of the equalization controller illustrated in FIG. 3.

Referring to FIG. 4, equalization controller 330 is shown in more detail. Equalization controller 330 is shared among input signals 141–144 for generating coefficients for application in signal filters 341–344. Equalization controller 330 includes multiplexor 410, flow controller 420, memory 430 and coefficient calculator 440. Multiplexor 410 is a four-to-one multiplexor arranged to sample input signals 141–144 individually and release the samples to memory 430. Input signals 141–144 are preferably sampled at link start-up and thereafter in response to degradation of the quality of corresponding output signals 161–164. Flow controller 420 controls flows within equalization controller 330, including selection of input signals 141–144 for sampling thereof via multiplexor 410, storing of samples in memory 430, application of samples to coefficient calculator 440 and application of coefficients calculated in coefficient calculator 440 to signal filters 341–344. Coefficient calculator 440 is a shared element which calculates dedicated coefficients for input signals 141–144 by individually subjecting samples of input signals 141–144 stored in memory 430 to the same tap coefficient algorithm. The tap coefficient algorithm preferably implements the wellknown Least Mean Square (LMS) Algorithm to calculate dedicated tap coefficients for input signals 141–144, see, e.g., Haykin, Adaptive Filter Theory (1995); Widrow & Steams, Adaptive Signal Processing (1985), although other tap coefficient algorithms may be employed. Tap coefficients are "dedicated" in that coefficients are generated based on samples taken from particular ones of input signals 141–144 and are applied to particular ones of signal filters 341–344 which receive the particular ones of input signals 141–144 as inputs. Thus, for instance, coefficients generated from sampling input signal 141 are applied to signal filter 341, coefficients generated from sampling input signal 142 are applied to signal filter 342, and so on. N tap coefficients are preferably generated for each input signal. The value of N in a given implementation of the present invention will generally vary in relation to the desired input signal sampling length. By way of example, for a Gigabit Ethernet signal transmitted over Category-5 cable, N may be five hundred twelve. Memory 430 is preferably implemented in random access memory (RAM), and samples from different input signals 141–144 are stored in different locations within memory 430.

Figure 5:
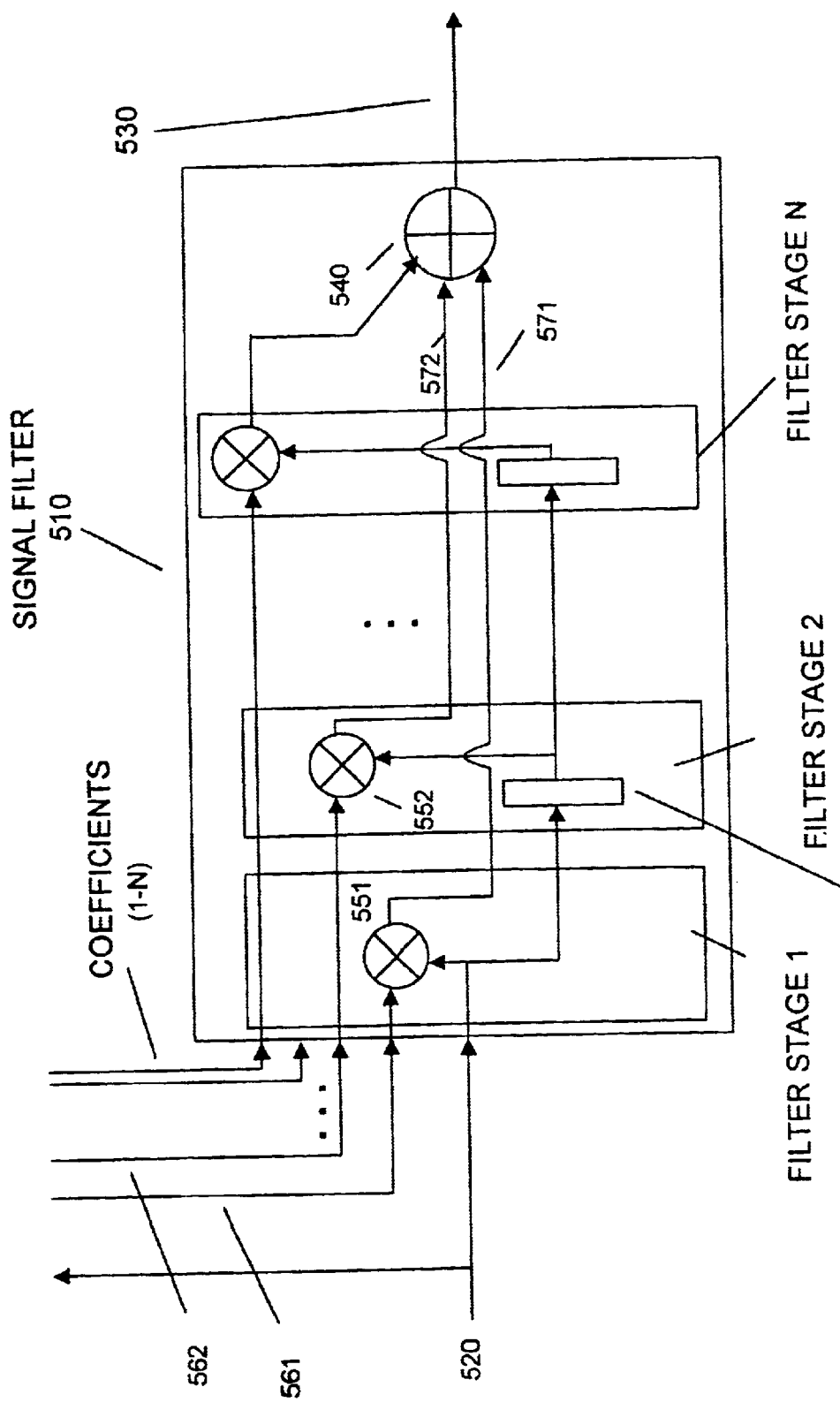
FIG. 5 is a more detailed block diagram of a signal filter illustrated in FIG. 3.

Referring to FIG. 5, signal filters 341–344 are shown in greater detail by reference to a representative signal filter 510. Filter 510 "taps" a representative input signal 520 in accordance with the most recent N coefficients received by filter 510 from equalization controller 310 to generate a representative output signal 530. Filter 510 includes N filter stages in which the N coefficients are applied. At each filter stage, a multiplier is applied to input signal 520 and a different one of the N coefficients to obtain a product which is applied to accumulator 540. Thus, for example, at filter stage one, multiplier 551 is applied to input signal 520 and coefficient 561 to obtain product 571 which is applied to accumulator 540. At filter stage two, multiplier 552 is applied to input signal 520 (via register 580) and coefficient 562 to obtain product 572 which is applied to accumulator 540, and so on. Accumulator 540 sums products 571, 572, and so on, to generate output signal 530 for transmission. It will be appreciated that as a result of the "tap" applied in filter 510 in the aforedescribed manner, distortion present on input signal 520 may be advantageously reduced on output signal 530. Further, as a consequence of using a shared equalization controller to generate dedicated coefficients for application in the "taps" applied in different signal filters, distortion may be advantageously reduced with relatively low equalization overhead.

Figure 6:
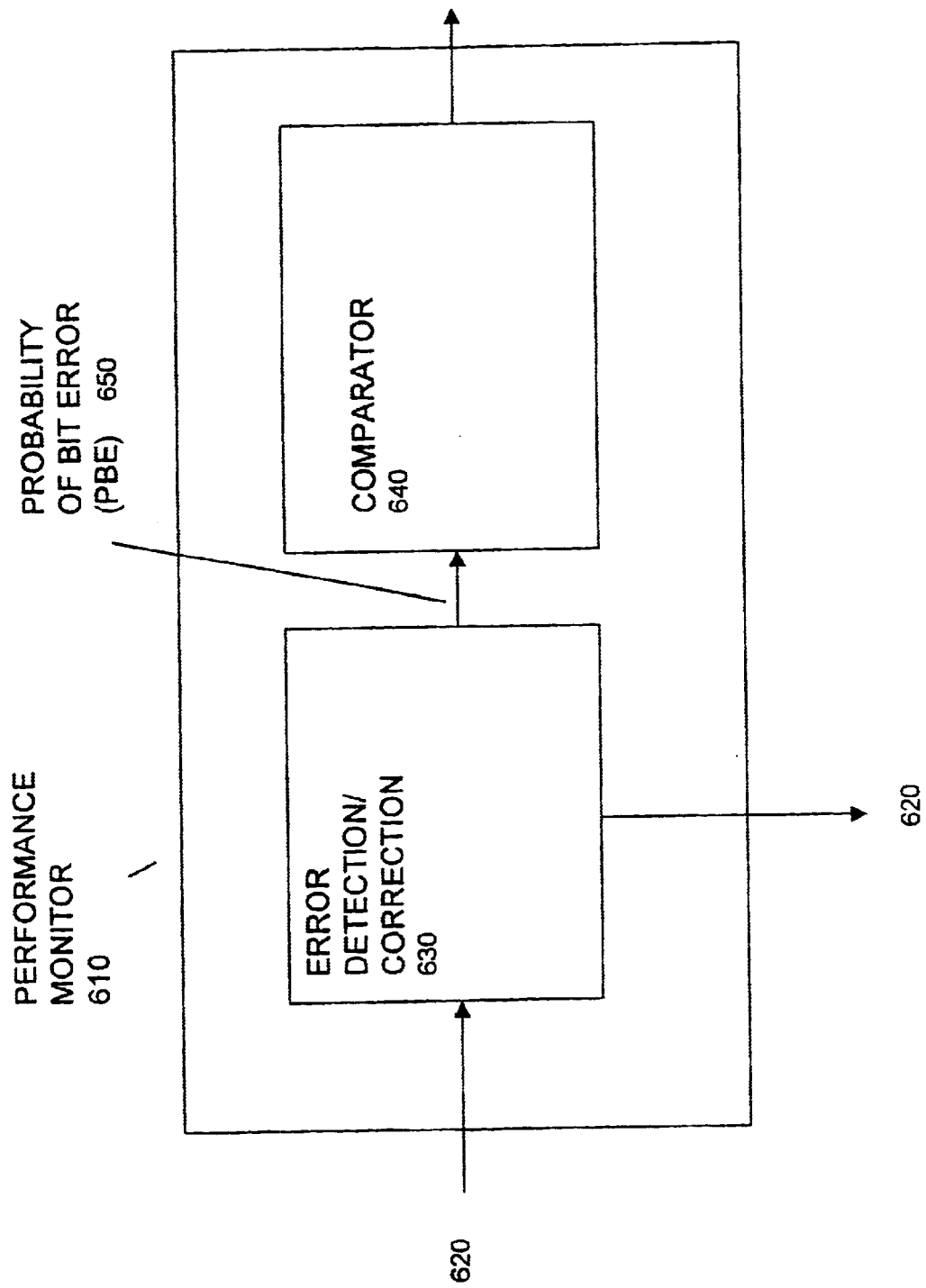
FIG. 6 s a more detailed block diagram of a performance monitor illustrated in FIG. 3.

Referring to FIG. 6, performance monitors 361–364 are shown in greater detail by reference to a representative performance monitor 610. Monitor 610 monitors a representative output signal 620 and notifies equalization controller 310 when the bit error rate of output signal 620 has exceeded a tolerable limit. Monitor 610 includes error detector 630 and comparator 640. Error detector 630 is preferably a Viterbi error detection/correction circuit that generates a probability of bit error rate (PBE) value 650 and applies PBE value 650 as an input to comparator 640. PBE value 650 is an estimated bit error rate for output signal 620. Comparator 640 is preferably a comparator circuit that compares PBE value 650 against a tolerable bit error rate stored on comparator 640. By way of example, for a Gigabit Ethernet signal transmitted over Category-5 cable, the tolerable bit error rate stored on comparator 620 may be $1 \times 10^{-6}$ bits per error. If PBE value 650 is greater than the tolerable bit error rate, comparator 620 transmits a coefficient update request to equalization controller 310, which results in eventual recalculation of the dedicated coefficients for the input signal corresponding to output signal 620. In a preferred embodiment, the request includes a'multibit value specifying a priority level determined by comparator 640 in relation to the magnitude by which output signal 620 has exceeded the tolerable bit error rate. It will be appreciated, however, that in other embodiments the request may simply be a single bit flag.

Figure 7:
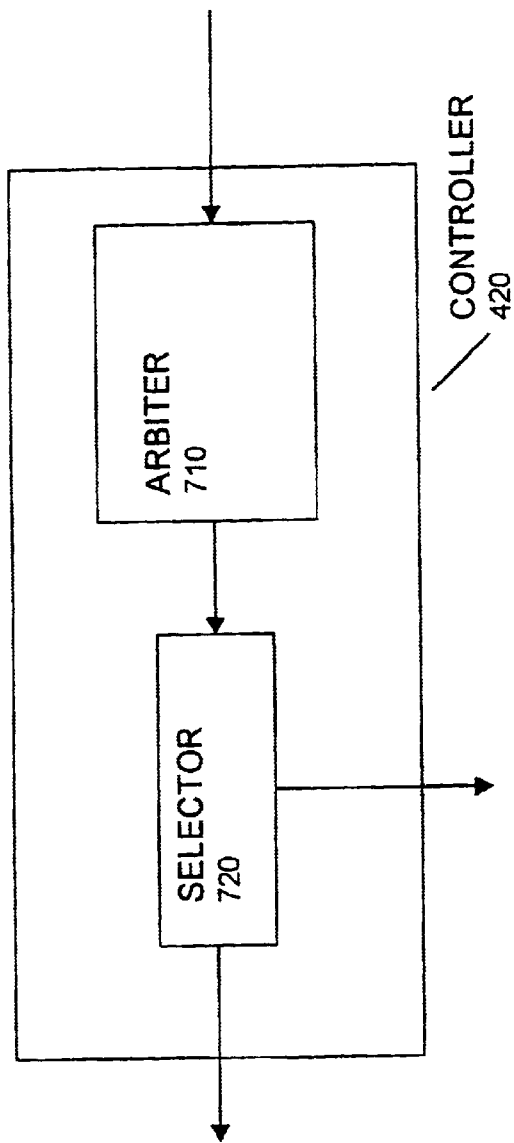
FIG. 7 is a more detailed block diagram of a flow controller illustrated in FIG. 3.

Referring now to FIG. 7, flow controller 420, first shown in FIG. 4, is shown in more detail. Flow controller 420 includes arbiter 710 and selector 720. Arbiter 710 receives coefficient update requests from performance monitors 361–364, arbitrates among received requests, and notifies selector 720 of the "winning" request. If a single request is pending, arbiter 710 selects that request. If multiple requests having different priority levels are pending, arbiter 710 selects the highest priority request among them. If multiple requests 'all having the same priority are pending, or the pending requests are not prioritized, a round-robin selection may be made. Based on information received from arbiter 710 regarding the "winning" request, selector 720 selects the corresponding one of input signals 141–144 for sampling via multiplexor 410, storing of samples in memory 430, application of samples to coefficient calculator 440 and application of the dedicated coefficients generated in coefficient calculator 440 to the corresponding one of filters 341–344.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

I claim:

1. An equalization apparatus, comprising:

a plurality of inputs for receiving respective input signals;

an equalization controller coupled to the inputs for receiving the respective input signals and generating respective tap coefficients therefrom;

a plurality of signal filters coupled to respective inputs and the equalization controller, for receiving the respective input signals and the respective tap coefficients and generating respective output signals therefrom; and a plurality of performance monitors coupled to respective signal filters and the equalization controller, for receiving the respective output signals and applying feedback to the equalization controller upon determining that the bit error rates for the respective output signals exceeds a predetermined threshold, wherein said feedback comprises a priority level determined in relation to a magnitude by which the respective output signals has exceeded the predetermined threshold.

2. The apparatus according to claim 1, wherein the equalization controller is further operative for updating the respective tap coefficients upon receiving said feedback from respective performance monitors.

3. The apparatus according to claim 1, wherein a plurality of tap coefficients are generated from each input signal.

4. The apparatus according to claim 3, wherein each signal filter includes means for applying an input signal as a first input to a plurality of multiply functions, each multiply function having as a second input a different one of the tap coefficients generated therefrom to generate a plurality of products, and applying the plurality of products to an accumulate function to generate an output signal.

5. An equalization method for improving the quality of signals received over a multichannel link using a shared tap coefficient function, comprising the steps of:

receiving a plurality of input signals;

sampling the input signals individually;

applying the samples individually to the tap coefficient function to generate coefficients; and applying the coefficients to the input signals from which the coefficients were generated to generate a plurality of output signals;

transmitting the output signals;

determining the bit error rate of the output signals individually; and repeating the sampling, applying, applying and transmitting steps for an output signal upon determining the bit error rate for the output signal exceeds a predetermined threshold.

6. Apparatus including an equalization controller shared among a plurality of input signals for generating a dedicated tap coefficient for each input signal including, for each input signal, sampling the input signal in a first instance and applying the first sample as an input to a tap coefficient algorithm, and for updating the dedicated tap coefficient for each input signal including, for each input signal, sampling the input signal in a second instance in accordance with feedback and applying the second sample as an input to the tap coefficient algorithm.

7. Apparatus according to claim 6 wherein a plurality of tap coefficients are generated for each input signal in each instance.

8. Apparatus according to claim 7 further comprising a configurable filter for receiving one of the input signals and for generating an output signal therefrom, including applying the input signal as a first input to a plurality of multiply functions, each multiply function having as a second input a different tap coefficient from within the plurality of tap coefficients generated for the input signal and received from the equalization controller to generate a plurality of products, and applying the plurality of products to an accumulate function.

9. Apparatus according to claim 6 further comprising a performance monitor for receiving an output signal generated from one of the input signals and the dedicated tap coefficient for the input signal, comparing the bit error rate of the output signal with a predetermined threshold and applying a feedback signal to the equalization controller if the output signal exceeds the predetermined threshold.

10. Apparatus according to claim 9 wherein the feedback signal includes a priority level.

11. The apparatus according to claim 1, wherein the equalization controller updates the tap coefficients based on the priority level of the respective feedback.

\* \* \* \* \*